(12) United States Patent
De Luca

(10) Patent No.: US 10,870,949 B2
(45) Date of Patent: Dec. 22, 2020

(54) MANUFACTURING PROCESS FOR FORMING DOMED PAPER

(71) Applicant: Create Technologies, Inc., Carson City, NV (US)

(72) Inventor: Nicholas P. De Luca, Carmel-by-the-Sea, CA (US)

(73) Assignee: Create Technologies, Inc., Carson City, NV (US)

(\*) Notice: Subject to any disclaimer, the term of this patent is extended or adjusted under 35 U.S.C. 154(b) by 0 days.

(21) Appl. No.: 16/237,568

(22) Filed: Dec. 31, 2018

(65) Prior Publication Data

US 2020/0208349 A1 Jul. 2, 2020

(51) Int. Cl.

| | | |
|---|---|---|
| *D21F 11/00* | (2006.01) | |
| *B32B 38/00* | (2006.01) | |
| *B32B 7/12* | (2006.01) | |
| *D21H 27/02* | (2006.01) | |
| *B32B 27/10* | (2006.01) | |
| *D21H 27/40* | (2006.01) | |

(52) U.S. Cl.
CPC ............. *D21F 11/006* (2013.01); *B32B 7/12* (2013.01); *B32B 27/10* (2013.01); *D21H 27/02* (2013.01); *D21H 27/40* (2013.01); *B32B 2317/12* (2013.01)

(58) Field of Classification Search
CPC ...... D21F 11/006; D21H 27/02; D21H 27/40; D21H 27/10; B32B 7/12; B32B 27/10; B32B 2317/12; B32B 38/0004
See application file for complete search history.

(56) References Cited

U.S. PATENT DOCUMENTS

| | | | | |
|---|---|---|---|---|
| 5,358,757 A | * | 10/1994 | Robinette | ........... B65D 63/1009 |
| | | | | 229/123.2 |
| 5,651,237 A | | 7/1997 | De Luca | |
| 6,116,000 A | | 9/2000 | Perkins et al. | |
| 6,659,150 B1 | | 12/2003 | Perkins et al. | |
| 9,315,312 B2 | | 4/2016 | De Luca et al. | |
| 2005/0119065 A1 | * | 6/2005 | Bettencourt | ........... A63B 53/14 |
| | | | | 473/300 |
| 2013/0171422 A1 | * | 7/2013 | De Luca | ................ B65D 81/03 |
| | | | | 428/172 |

\* cited by examiner

*Primary Examiner* — Mark A Osele
*Assistant Examiner* — Christopher C Caillouet
(74) *Attorney, Agent, or Firm* — Capitol City TechLaw; Jasbir Singh

(57) ABSTRACT

The present teachings disclose s a process for forming paper domes including: indexing two or more sheets of cut material intended to form a dome when pressed where at least one of the sheets has a cured or dried glue already adhered thereto, applying a glue activator solvent such as water on an exterior top or exterior bottom surface of at least one of the sheets, pressing the sheets together with heat and pressure to form a completed combined sheet with multiple domes, and moving the completed combined sheet.

19 Claims, 9 Drawing Sheets

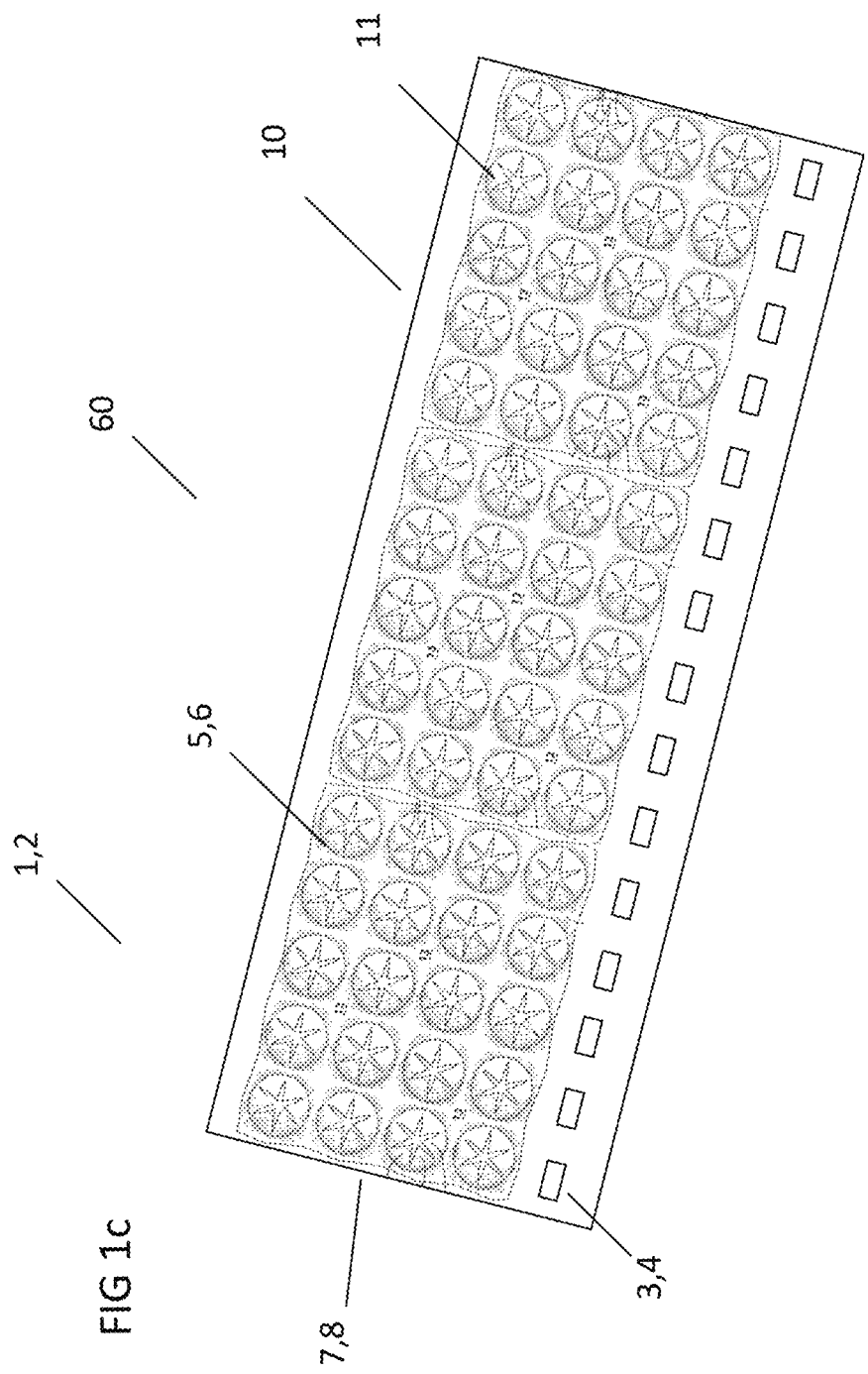

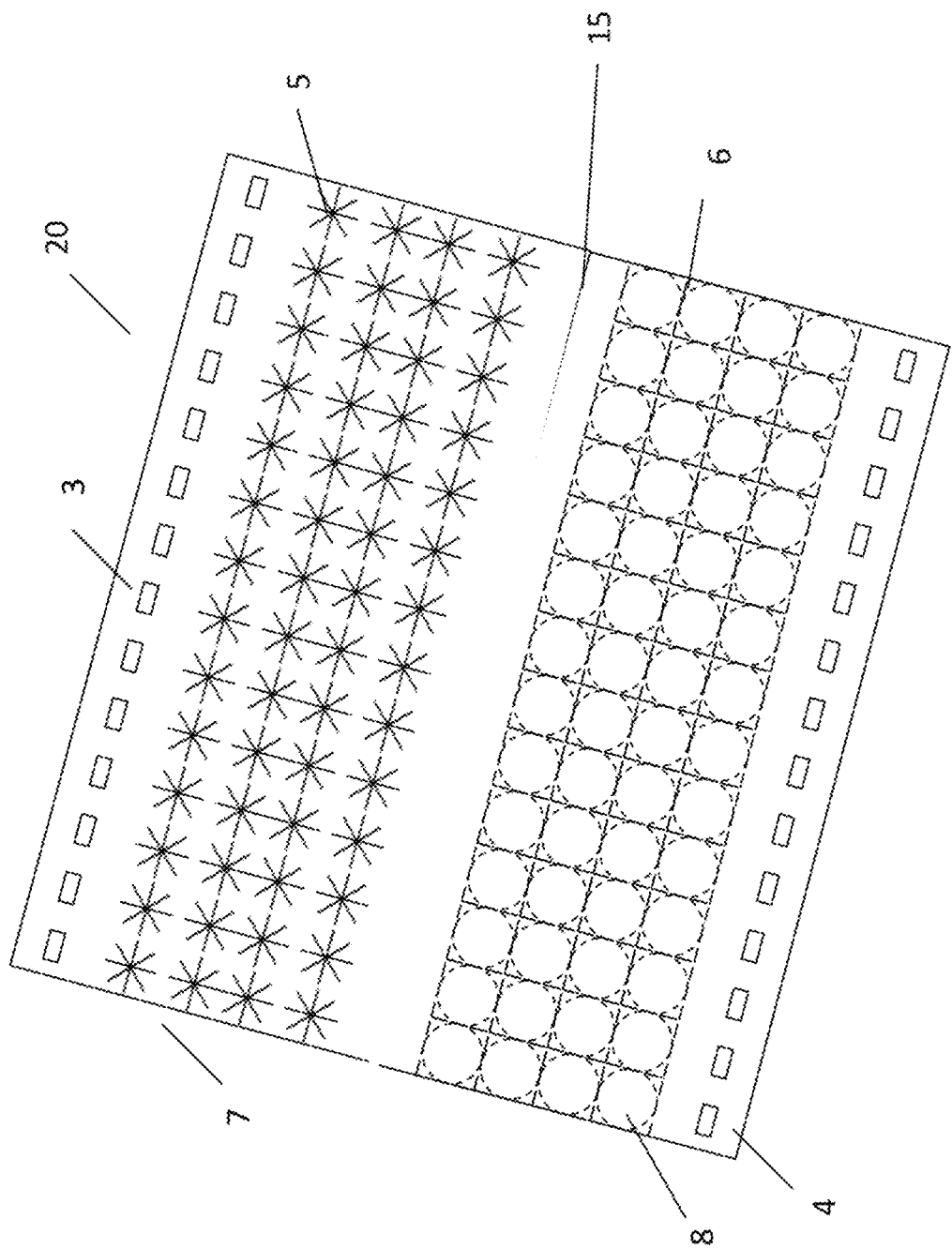

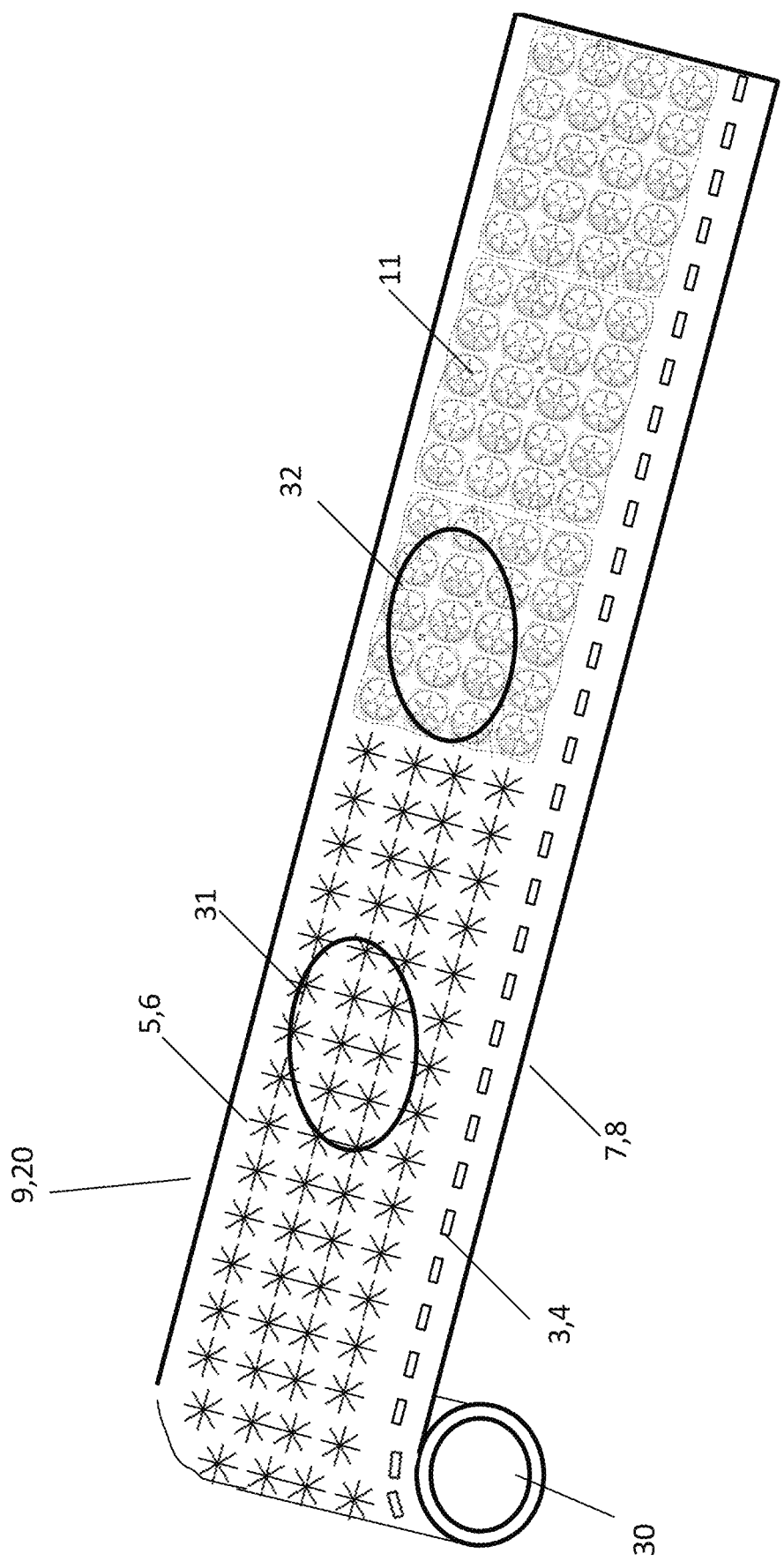

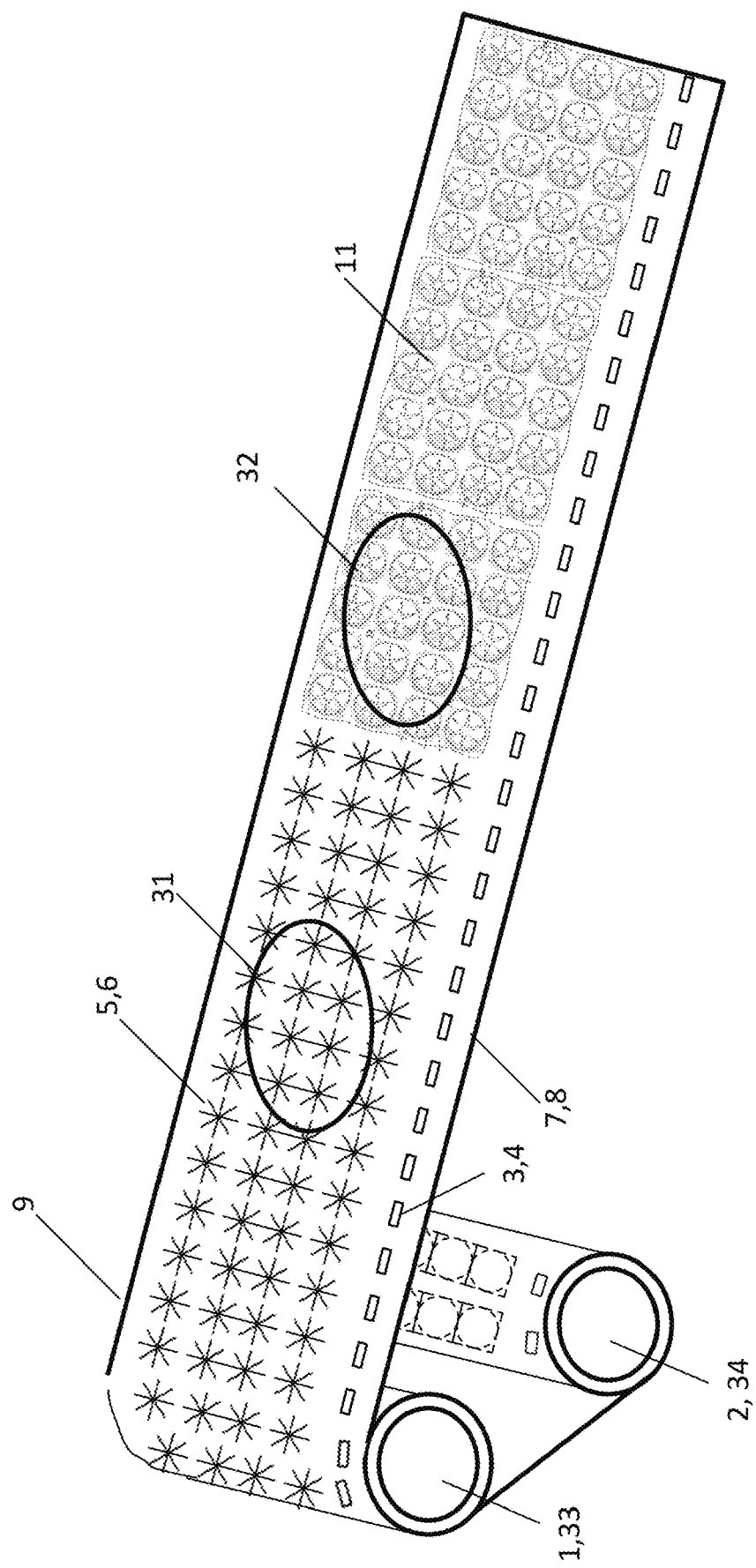

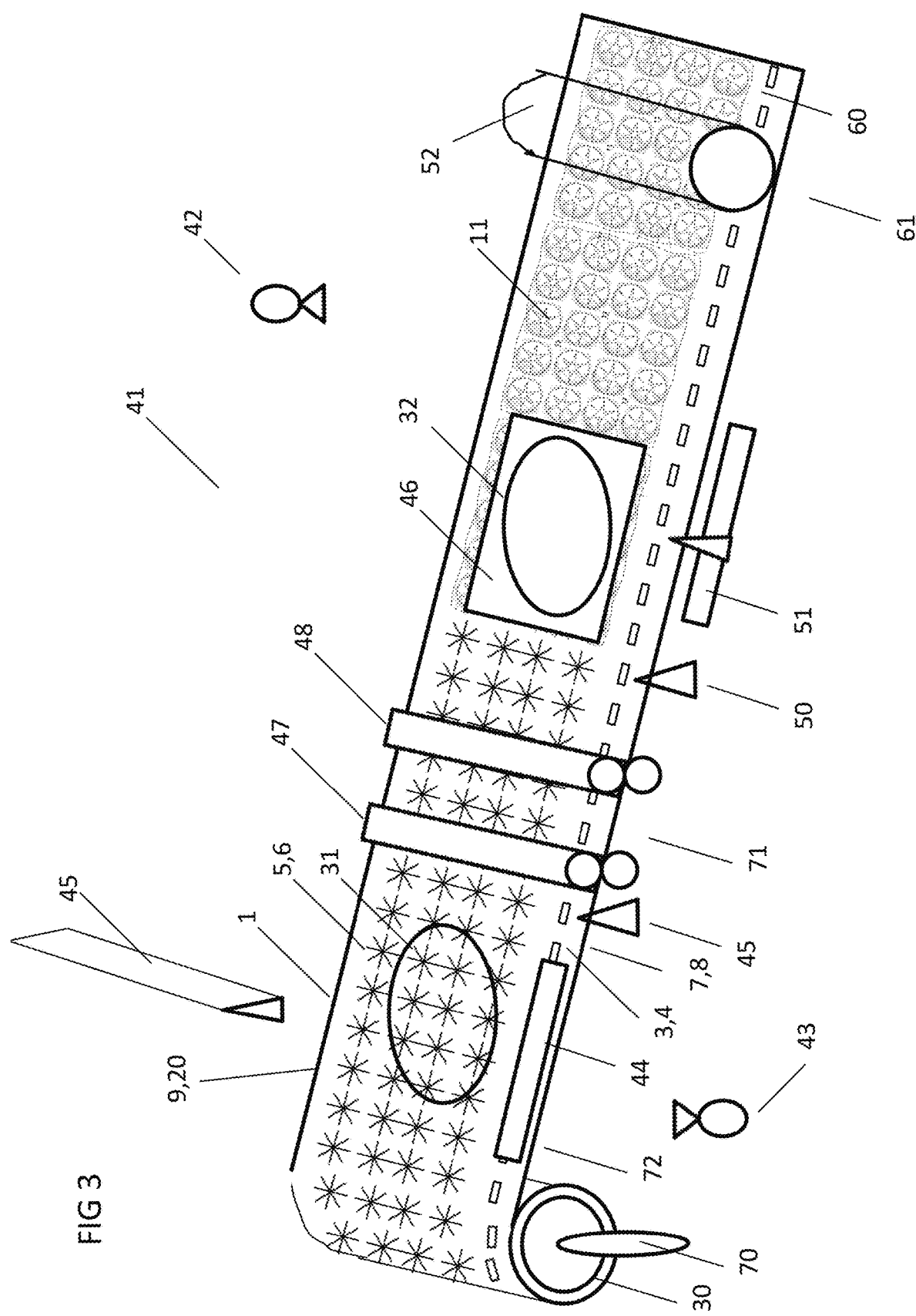

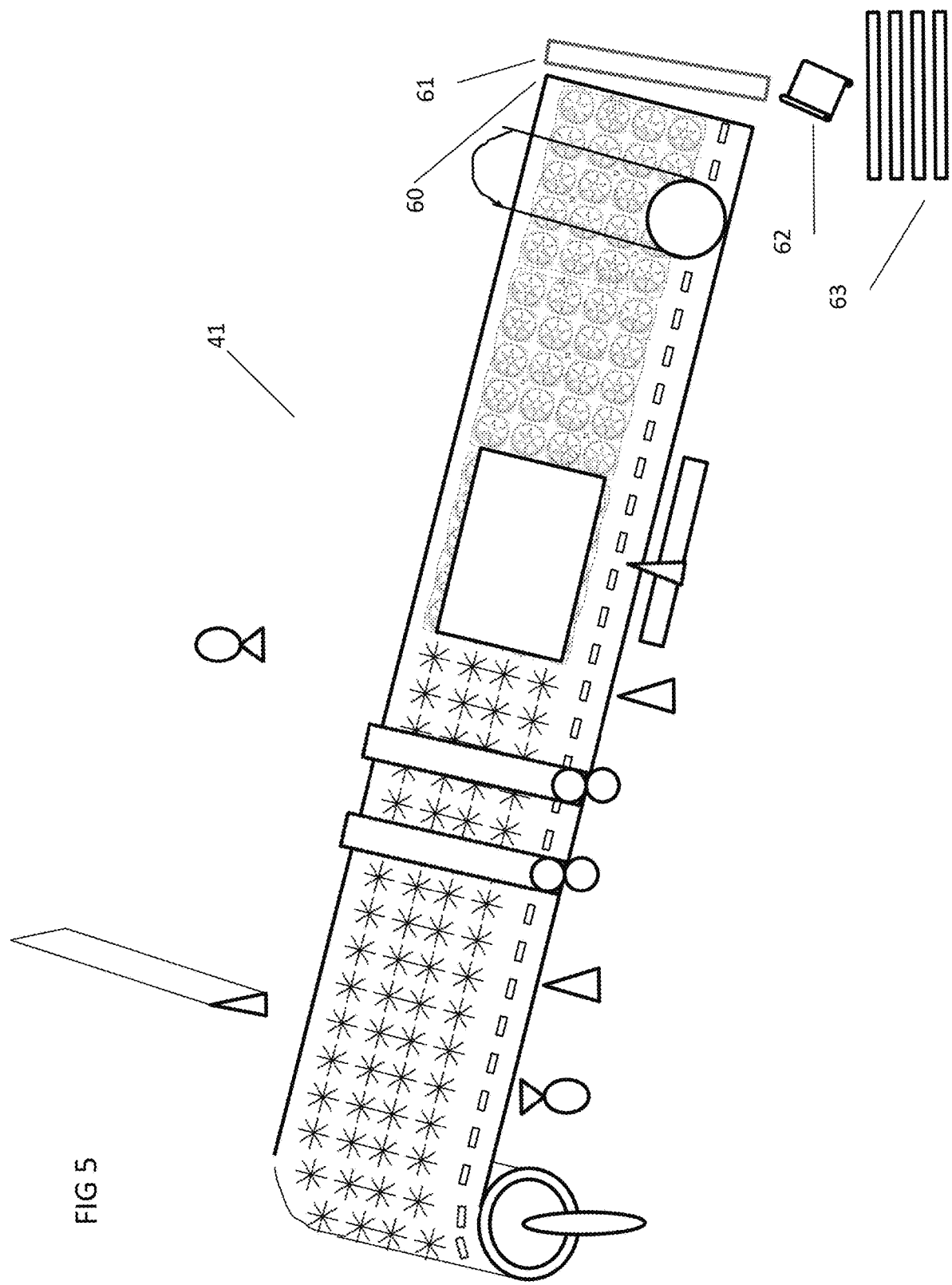

MANUFACTURING PROCESS FOR FORMING DOMED PAPER

FIELD

The present disclosure teaches a manufacturing process for making paper with multiple domes as further described by De Luca et al. in U.S. Pat. No. 931,531B2 "Domed Multilayer Cushioning Article". The system incorporating a pre-cured adhesive, a web feeding system, a water delivery technique including a staging area, registration and alignment means as well as pressing and release means. The entire system integration allowing for a portable unit to be constructed to deliver domed paper formed from multiple layers of paper material. The system further incorporating a method for layering the domes, forming the domed paper into other structures such as envelopes, sleeves, or boxes, as well as combining the domed paper with other materials including adhesives

BACKGROUND

Package cushioning materials are generally bulky structures filled with air or formed in a hollow structure to provide optimal shock protection characteristics for products. One of the major disadvantages of these materials involves the cost of shipping them to the location of eventual use (i.e. a fulfillment center) which generally becomes cost prohibitive past 200 miles from the manufacturing location. In order to enable distribution of cushioning products a greater distance from their location of manufacture, when possible, the packaging industry has developed equipment that provides the "bulking" of the material at the end customer site versus being done at the original manufacturing location. As an example, air packaging products use automated inflators to form wrap on site from compact rolls; for example, U.S. Pat. Nos. 5,651,237A, 6,659,150B1, 6,116,000A describe such systems. In the case of air packaging, a compact roll of plastic can be increased in volume by as much as 500 times when at use at a customer site. Other products such as urethane foam use dispensers that combine two or more compact chemicals at the customer location and allow the expansion to occur at the time of use—also saving hundreds of times the volume when shipping from the manufacturer. With respect to paper products, companies such as Sealed Air Corporation, RanPak Corp, StoroPak Inc., provide machines that mechanically crumple or cut paper to increase the volume—generally 30-80 times. While all these systems exist, none are adapted or modifiable to form the domed paper material described by De Luca et. al in U.S. Pat. No. 931,531B2 "Domed Multilayer Cushioning Article".

In forming the domed paper product from multiple paper sheets in a machine system, several very challenges arise. Generally, two rolls of paper are combined to form the domes through a pressing process, each roll having a succession of cuts that mate; the first having cuts that form the flaps and the second having a cut that forms a cap to form the dome.

The first of these challenges involve the correct registration of the top and bottom sheets such that the form of the dome can be made accurately. In order to create a dome, the patterns cut into each sheet must match exactly with the cap formed from one sheet centered with the flaps that are formed on a second sheet. If there is misalignment of over 5% between the top and bottom layers, a deformed dome is produced which does not have the same aesthetic or functional characteristics.

As further described in U.S. Pat. No. 931,531B2 in the most common embodiment, one of the sheets is applied with adhesive between the sheets prior to being pressed. The application of glue as described in FIG. 7 of U.S. Pat. No. 931,531B2 is difficult to control in an on-demand application and creates added expense to a machine intended to be portable and inexpensive. The inherent challenges of using a liquid adhesive between the sheets when forming the domed paper are several. When merged together from separate rolls, the normal placement of the moisture between the sheets creates adhesion; if the two sheets are not perfectly joined though, then the misalignment creates additional tension that progressively distorts the domes. In addition, a spray nozzle or contact roller is generally cumbersome and can make the process more difficult to use as the sheets are brought in close proximity. The use of a wet adhesive further weakens the paper and can result in small tears that create stretch misalignment.

While aligning the first set of sheets is not difficult, any tolerance discrepancy in placement or in cutting tends to create a geometric tolerance stack which then quickly leads to misalignment. This tends to distort the paper and make it weaker while the pressing locks any misalignment in place. The repetition over multiple cycles then stacks these errors up and eventually leads to a significant disfiguration of the domes. To further clarify, it is important that not only the cuts in the top and bottom sheets be aligned but that the pressing of the combined sheets with a forming dome occurs exactly over the center of the sheets. While registration cuts can be used to match the two sheets, a very slight consistent difference in the cut dies can lead to a mismatch between the two rolls over time.

The challenge of positioning the combined top and bottom sheet in the correct location under the press is further a difficult step. When indexing the sheet forward, the overall discrepancy of 1% in the overall distance of movement creates over a 10% discrepancy in the alignment of all domes under the press. In some cases, the press may move while forming the domes and thus create additional stretch or damage to the paper substrate.

The difficulty of indexing the domed paper consistently forward once formed is another challenge that needs to be overcome in an automated machine. Paper can shift easily in the orthogonal directions to the indexed one and this is in part due to inconsistencies of the paper composition, changes in thickness and moisture, as well as inconsistencies of the press. Tension applied non-uniformly at the end of the process can move up stream and affect the position of the cuts under the press, thus creating a feedback loop that distorts the process.

It is therefore a primary objective of the following invention to provide a portable consistent manufacturing process able of forming paper with domes per U.S. Pat. No. 931,531B2.

It is a further objective of the current invention that the continuous manufacturing process allow for the consistent alignment of the cut top and bottom layers.

It is another objective of the current invention that the manufacturing process allow for the use of rolled paper having a predisposed adhesive that is applied in a controlled fashion and that is further activated only at the time of forming the domes within a portable machine system with a liquid such as water.

It is a further objective of the current invention per the constraint above that the application system for the water activator not interfere with the alignment of the sheets.

It is another object of the current invention to allow for the proper and aligned indexing of the formed domes.

SUMMARY

The present teachings provide embodiments of a novel automated manufacturing process for continuously producing paper with multiple domes per U.S. Pat. No. 931,531B2, and the features thereof offering various benefits. The system having an unwinding section to release a precut top and bottom sheet of paper in a continuous or indexed fashion with one or both sheets having an adhesive predisposed between the sheets and activated by a liquid. The indexing system using a series of notches located in each layer of paper as a registration means to center the sheets upon each other and further including a locating and counting means such as a visual, capacitive, piezoelectric, acoustic, or physical sensor. In some cases, the feed path also including a correction zone to advance one sheet with respect to the other prior to the pressing of the sheets together. In some cases, the two layers may be brought together in orthogonal directions with an additional separation step to minimize the potential for misalignment. The process also including the application of an activator such as water on the external or opposite side of the sheet where the bonding is intended to occur and a blocking shield to prevent the distortion or weakening of the sheet at the registration and/or feeding areas of the material. In some cases, steam may be passed through the die and applied on the exterior top or bottom of the paper during the pressing step. The heat and/or steam pressing system being stationary or capable of moving and registering with the material such that the pressing domes are centered correctly with the cuts of both sheets to produce a symmetrical and even dome. After pressing, the indexing of the material through the system is done by employing a cupped drive roller that matches in shape with the domes produced and evenly distributes the tension across the finished form. Additional secondary processes using the finished domed material including: applying secondary adhesives, integrating within boxes or containers, forming into envelopes or stacked cushions or rolls or sleeves, incorporating tags (including barcodes or rid tags), and applying additional cuts or closures may be accomplished.

The present teachings disclose s a process for forming paper domes including: indexing two or more sheets of cut material intended to form a dome when pressed where at least one of the sheets has a cured or dried glue already adhered thereto, applying a glue activator solvent such as water on an exterior top or exterior bottom surface of at least one of the sheets, pressing the sheets together with heat and pressure to form a completed combined sheet with multiple domes, and moving the completed combined sheet.

Implementations may include one or more of the following features. The process where one or more of the sheets originate from a roll of continuous sheets with cuts intended to form the multiple domes when pressed together. The process further including web tensioning and/or unwinding equipment. The process further including aligning the sheets prior to pressing. The process where one or more of the sheets have one or more registration marks and/or cut(s) used to register a location of each sheet with respect to the other. The process further including registering a location of the sheets, prior to pressing, with one or more of the following sensors: a visual, infrared, capacitive, piezoelectric, acoustic, camera, or physical sensor. The process further including using independent feed rollers to achieve alignment. The process further including using a linear indexing system to achieve alignment. The process further including providing a compression zone where either sheet is slightly compressed in order to achieve alignment. The process further including moving the press to align with the sheets to be pressed. The process further including misting an activator such as water on the exterior top or exterior bottom surface of one or more of the sheets. The process further including preventing the mist from wetting or activating specific locations of one or more of the sheets. The process where the non-activated locations are intended to feed and/or register a location of either sheet. The process where the indexing includes indexing the combined completed sheets after pressing by physically engaging the domes. The process where the indexing includes using a roller with corresponding depressions at each dome. The process further including forming a pressed domed paper into one or more of the following: a box, a sleeve, an envelope, a layered cushion, a single sheet. The process further including adding or integrating a pressed domed sheet with one or more of the following: a box, a cup, a plate, a container, an rfid tag, an adhesive, or another material. The process in which the sheets are fed together in a non-colinear or orthogonal manner. The process further including separating the combined pressed sheet from a section of non-pressed sheet. The process including activating an external input from a push button or sensor.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention, and together with the description explain the principles of the invention.

FIG. 1c is an isometric view of two cut sheets after being pressed together in the process of forming a domed paper sheet.

FIG. 1d is an isometric view of a single cut sheet intended to be folded to form the overlaid sheets of FIG. 1b.

FIG. 2a is an isometric view of two rolls of cut material attached to a pressed section forming domes.

FIG. 2b is an isometric view of a single roll of cut material attached to a pressed section forming domes.

FIG. 3 is an isometric view of the sheet of FIG. 2a further indicating key areas required in a machine system to form the domes in a continuous manner.

FIG. 5 is an isometric view of the machine of FIG. 4 further including a secondary integration process such as forming an envelope.

Figure 1A:
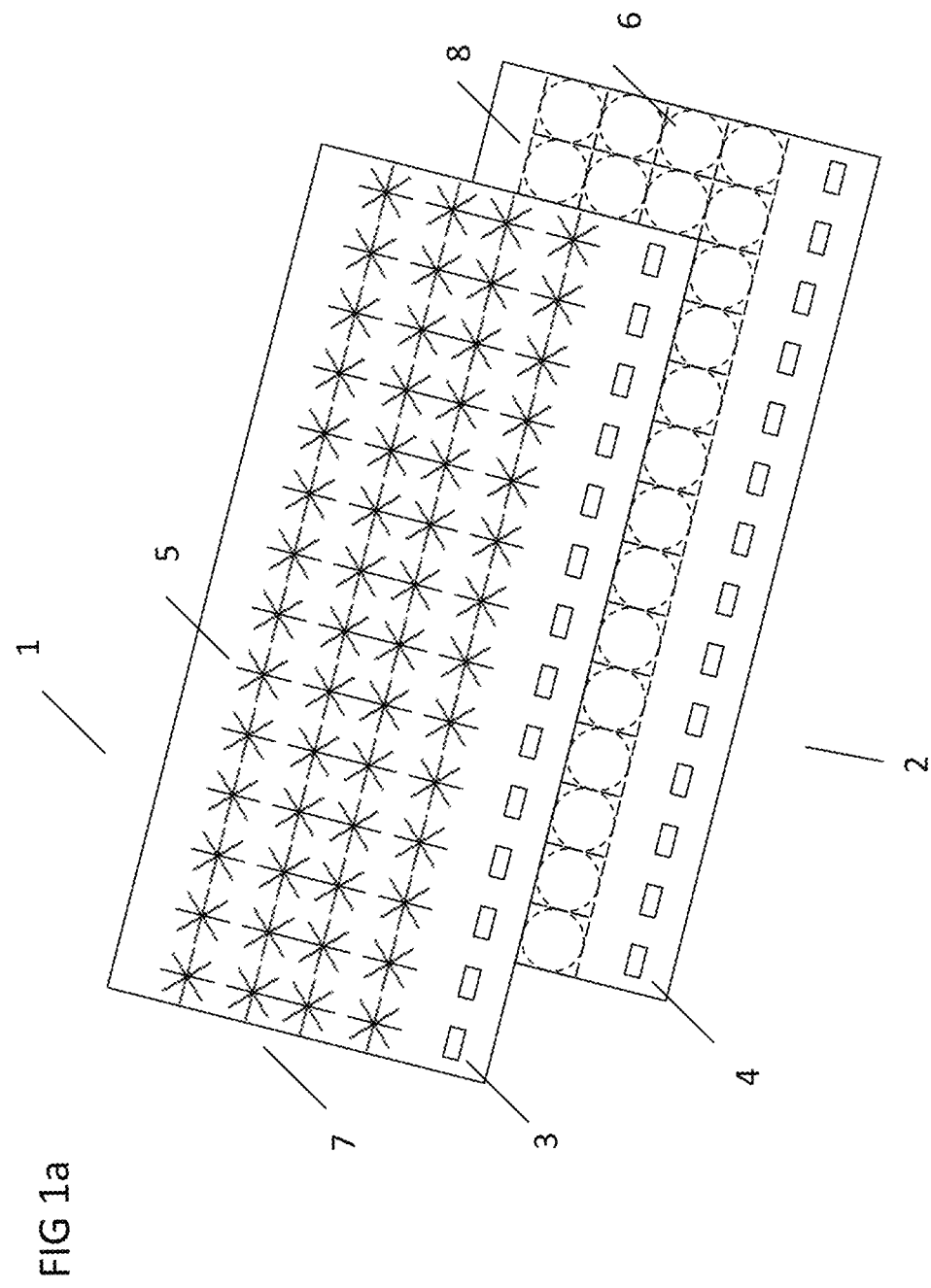
FIG. 1a is an isometric view of two cut sheets partially overlaid in the process of forming domed paper structure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DESCRIPTION

The present teachings disclose a novel process for manufacturing domed paper.

FIG. 1a is an isometric view of two cut sheets 1 and 2 partially overlaid in the process of forming domed paper structure. Flaps 5 cut into sheet 1 and caps 6 cut into sheet 2 are positioned to overlay on top of each other while registration cuts 3 and 4 are used to align the two sheets accurately. In some cases, printing may be used in lieu of cuts 3 and 4. The underside of sheet 1, area 7 or the top side of sheet 2, area 8 are coated with an adhesive that is activated by the addition of water or other solvent or curing agent.

Figure 1B:
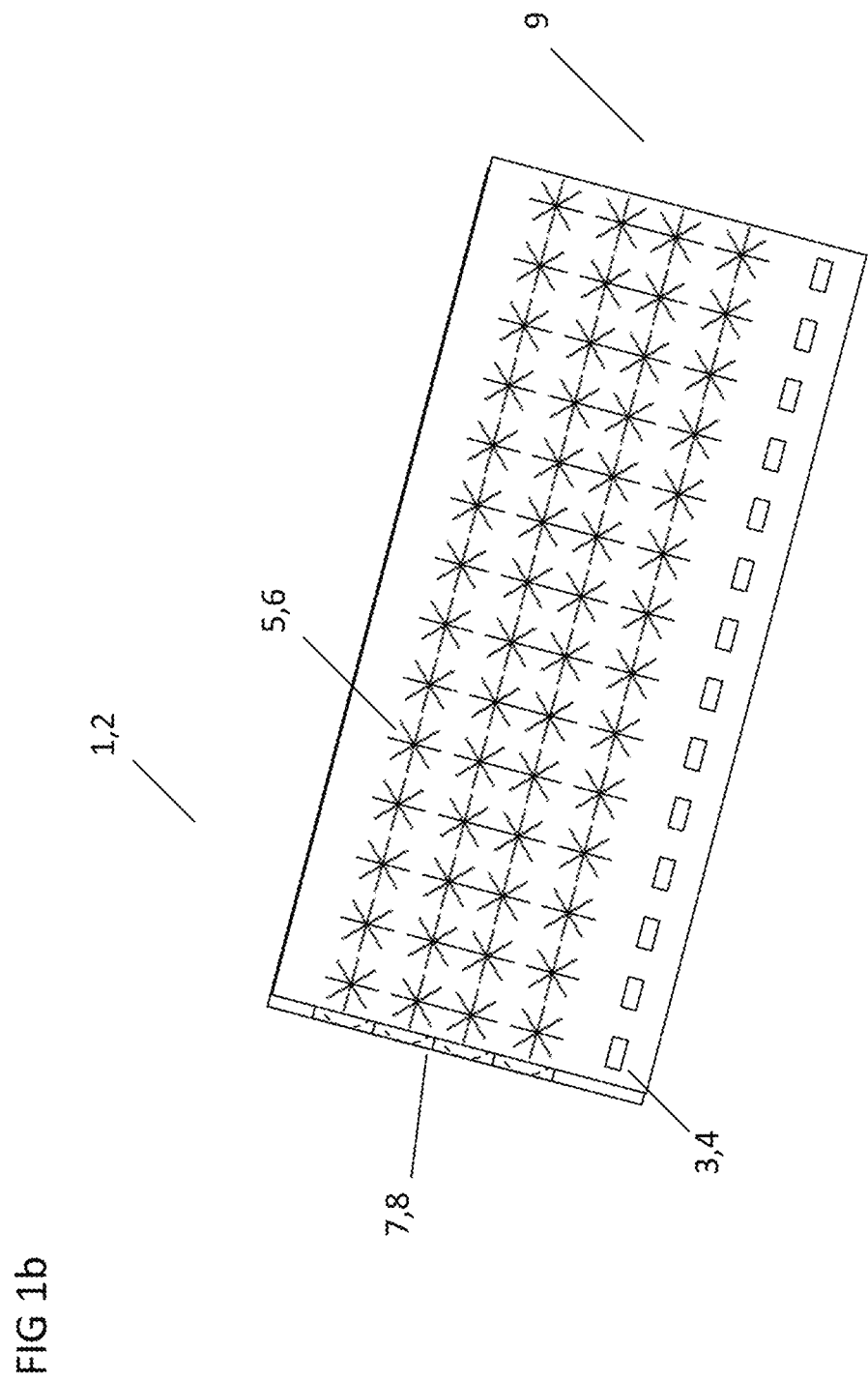
FIG. 1b is an isometric view of two cut sheets fully overlaid in the process of forming domed paper structure.

In FIG. 1b, the isometric view shows an overlay of sheets 1 and 2 when registered together. Surfaces 7 and 8 are in contact and the very thin adhesive placed on one or both surfaces is dry. For example, dextrin adhesives may be applied and dried to sheet 1 or 2 prior to forming cuts 3 and 4 and then reactivated again during the process of forming the domes 11 shown on pressed sheet 10 of FIG. 1c to form sheet 60.

FIG. 1d illustrates a single sheet 20 formed with both cuts 5 and 6 as well as registration cuts 3 and 4. On either side of center line 15 an adhesive may be placed such that when folding at center line 15 the two halves mate similarly to what is shown in FIG. 1b.

FIG. 2a illustrates a continuous roll 30 of sheet 9 of FIG. 1b or a folded sheet 20 of FIG. 1d also rolled from roll 30 and then pressed to form domes 11. The exterior of area 31 forming an ideal location for spraying water or other solvent to dissolve the glue located on the interior surfaces 7 and 8. Area 32 presses and forms the domes 11 in area 32. In FIG. 2b two separate continuous rolls of sheets 1 and 2 are combined to form combined a continuous sheet 9 with domes 11 formed from the sheet.

FIG. 3 is an isometric drawing illustrating the machine system 41 used to produce sheet 60 from roll 30 of FIG. 2a. Tensioning system 70 enables tension to be applied to the paper (i.e. on the order of 1-2 ft-lbs.) as the material 9 or 20 is fed through the system 41. When in area 31, mister 45 sprays an even coat of solvent that passes through the top layer 1 and activates the interior adhesive at 7 and 8. Shield 44 prevents the water from damaging the registration cuts 3 and 4 which are sensed with sensors 45 and 50. Sensors 45 and 50 are capable of measuring the alignment of the cuts or marks 3 and 4 and using independent drive rollers 47 and 48 sheet 1 and 2 can be shifted within zone 71 to ensure accurate placement under press 46 in area 32. In addition, visual sensors including cameras 42 and 43 can be used to insure product quality and alignment. In addition, mechanically engaging pins on a roll can engage with cuts 3 and 4 and be used for additional registering means. The drive system 61 has roller 52 with depressions corresponding to the position of domes 11 and is used to drive the domed paper forward which may be fragile at times and requires distributed force to move. Indexer 51 may also be used for indexing. In zone 72, sheet 2 may be fed into the system 41 through a feeding and cutting mechanism placed orthogonally to the finished sheet 60.

Figure 4:
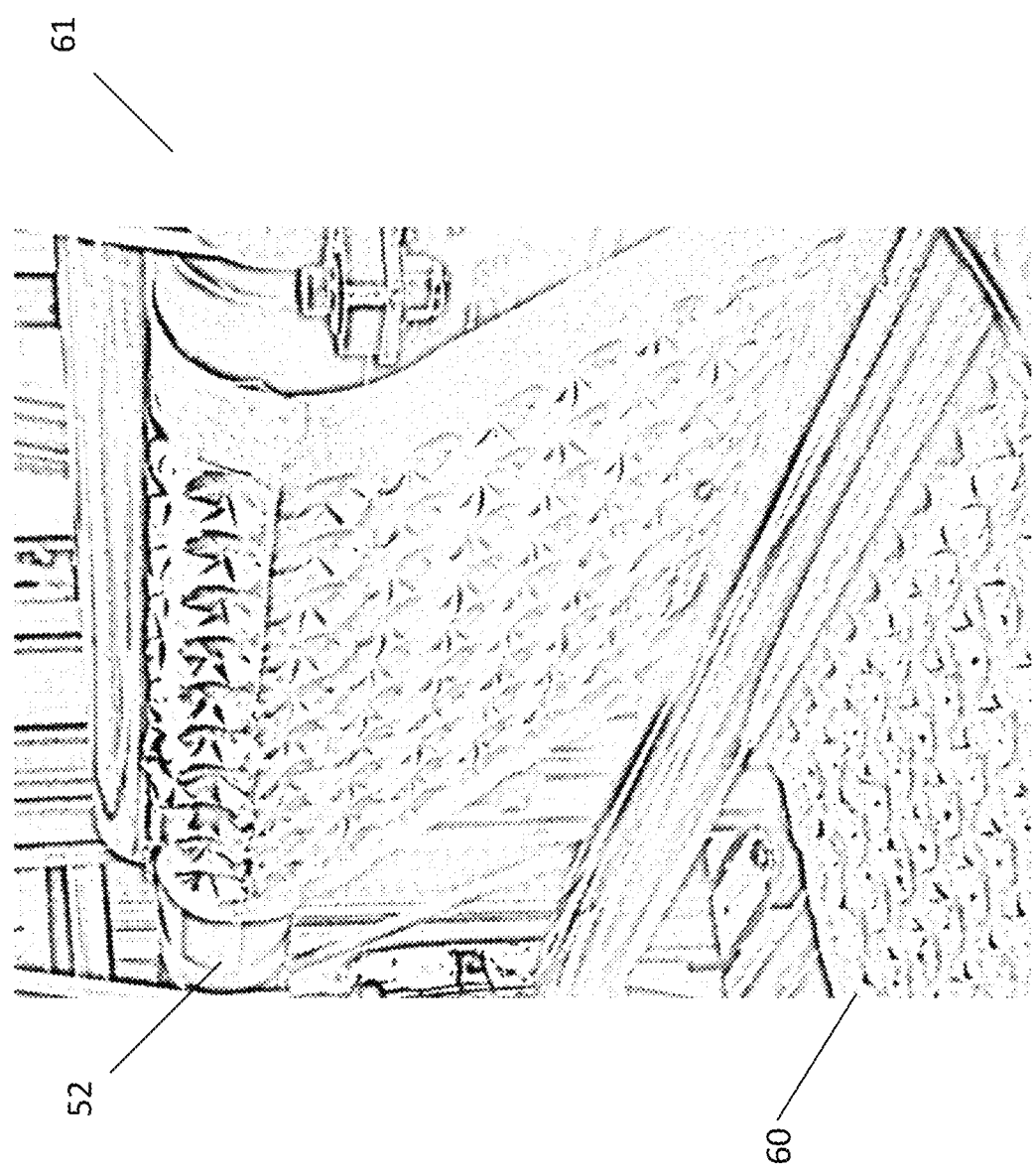
FIG. 4 is an isometric view of the pull roller engaged to index the formed domed paper of FIG. 1c.

FIG. 4 details the drive system 61 advancing finished domed material 60.

FIG. 5 illustrates secondary production process 62 to form finished domed material 62 into sleeves. This processes normally having a sheeter or cutter 61 used to separate part of sheet 60 to be used within said secondary process.

The examples presented herein are intended to illustrate potential and specific implementations. It can be appreciated that the examples are intended primarily for purposes of illustration for those skilled in the art. The diagrams depicted herein are provided by way of example. There can be variations to these diagrams or the operations described herein without departing from the spirit of the invention. For instance, in certain cases, method steps or operations can be performed in differing order, or operations can be added, deleted or modified.

What is claimed is:

1. A process for forming paper domes comprising:
   Indexing two or more sheets of cut material intended to form a dome when pressed wherein at least one of the sheets has a cured or dried glue already adhered thereto;
   Applying a glue activator solvent such as water on an exterior top or exterior bottom surface of at least one of the sheets;
   Pressing the sheets together with heat and pressure to form a completed combined sheet with multiple domes; and
   Moving the completed combined sheet,
   wherein the sheets are fed together in a non-co-linear or orthogonal manner.

2. The process of claim 1 wherein one or more of the sheets originate from a roll of continuous sheets with cuts intended to form the multiple domes when pressed together.

3. The process of claim 2 further comprising web tensioning and/or unwinding equipment.

4. The process of claim 1 further comprising aligning the sheets prior to pressing.

5. The process of claim 4 wherein one or more of the sheets have one or more registration marks and/or cut(s) used to register a location of each sheet with respect to the other.

6. The process of claim 4 further comprising registering a location of the sheets, prior to pressing, with one or more of the following sensors: a visual, infrared, capacitive, piezoelectric, acoustic, camera, or physical sensor.

7. The process of claim 4 further comprising using independent feed rollers to achieve alignment.

8. The process of claim 4 further comprising using a linear indexing system to achieve alignment.

9. The process of claim 4 further comprising providing a compression zone wherein either sheet is slightly compressed in order to achieve alignment.

10. The process of claim 4 further comprising moving a press to align with the sheets to be pressed.

11. The process of claim 1 further comprising misting an activator such as water on the exterior top or exterior bottom surface of one or more of the sheets.

12. The process of claim 11 further comprising preventing the mist from wetting or activating specific locations of one or more of the sheets.

13. The process of claim 12 wherein the non-activated locations are intended to feed and/or register a location of either sheet.

14. The process of claim 1 wherein the indexing comprises indexing the combined completed sheets after pressing by physically engaging the domes.

15. The process of claim 14 wherein the indexing comprises using a roller with corresponding depressions at each dome.

16. The process of claim 1 further comprising forming a pressed domed paper into one or more of the following: a box, a sleeve, an envelope, a layered cushion, a single sheet.

17. The process of claim 1 further comprising adding or integrating a pressed domed sheet with one or more of the following: a box, a cup, a plate, a container, an RFID tag, an adhesive, or another material.

18. The process of claim 1 comprising activating an external input from a push button or sensor.

19. A process for forming paper domes comprising:
Indexing two or more sheets of cut material intended to form a dome when pressed wherein at least one of the sheets has a cured or dried glue already adhered thereto;
Applying a glue activator solvent such as water on an exterior top or exterior bottom surface of at least one of the sheets;
Pressing the sheets together with heat and pressure to form a completed combined sheet with multiple domes;
Moving the completed combined sheet; and
separating the combined pressed sheet from a section of non-pressed sheet; wherein the sheets are fed together in a non-co-linear or orthogonal manner.

\* \* \* \* \*